United States Patent
Hesjevik et al.

(10) Patent No.: US 9,625,078 B2
(45) Date of Patent: Apr. 18, 2017

(54) PIPELINE AND METHODS

(71) Applicant: TECHNIP NORGE AS, Sandvika (NO)

(72) Inventors: Sven Morten Hesjevik, Vikhammer (NO); Erik Levold, Trondheim (NO); Per Egil Kvaale, Flatasen (NO)

(73) Assignee: TECHNIP NORGE AS (NO)

( * ) Notice: Subject to any disclaimer, the term of this patent is extended or adjusted under 35 U.S.C. 154(b) by 0 days.

(21) Appl. No.: 14/408,486

(22) PCT Filed: May 9, 2013

(86) PCT No.: PCT/EP2013/059688
§ 371 (c)(1),
(2) Date: Dec. 16, 2014

(87) PCT Pub. No.: WO2013/189658
PCT Pub. Date: Dec. 27, 2013

(65) Prior Publication Data
US 2015/0184788 A1   Jul. 2, 2015

(30) Foreign Application Priority Data

Jun. 19, 2012 (EP) .................................... 12172555

(51) Int. Cl.
*F16L 58/00* (2006.01)
*C23F 13/10* (2006.01)
(Continued)

(52) U.S. Cl.
CPC ............. *F16L 58/00* (2013.01); *B23P 11/025* (2013.01); *B63B 35/03* (2013.01); *C23F 13/10* (2013.01);
(Continued)

(58) Field of Classification Search
USPC .......................................................... 138/309
See application file for complete search history.

(56) References Cited

U.S. PATENT DOCUMENTS 2,655,638 A    10/1953 Allen
3,739,456 A     6/1973 Scherer et al.
(Continued)

FOREIGN PATENT DOCUMENTS

DE    26 36 905 B1    10/1977
DE       3544128    *  6/1987
(Continued)

OTHER PUBLICATIONS

International Search Report dated Jun. 7, 2013 issued in corresponding International patent application No. PCT/EP2013/059688.

(Continued)

*Primary Examiner* — Sean Andrish
(74) *Attorney, Agent, or Firm* — Ostrolenk Faber LLP

(57) ABSTRACT

A pipeline comprising one or more pipes, the pipeline having: one or more sacrificial anodes to provide cathodic protection; one or more pre-formed one-piece integral metallic rings around at least one pipe; and one or more electrical connectors attached to the or each metallic ring and to at least one sacrificial anode to allow an electrical current to flow between the pipeline and one or more of the sacrificial anodes. Each metallic ring has a one-piece form and can be fitted to the pipe without welding.

18 Claims, 1 Drawing Sheet

(51) Int. Cl.
*B23P 11/02* (2006.01)
*B63B 35/03* (2006.01)
*C23F 13/20* (2006.01)
*F16L 1/12* (2006.01)
*F16L 1/235* (2006.01)
*F17D 5/06* (2006.01)

(52) U.S. Cl.
CPC .............. *C23F 13/20* (2013.01); *F16L 1/123* (2013.01); *F16L 1/235* (2013.01); *F17D 5/06* (2013.01); *C23F 2201/00* (2013.01); *C23F 2213/20* (2013.01); *C23F 2213/31* (2013.01); *C23F 2213/32* (2013.01); *Y10T 29/49117* (2015.01)

(56) References Cited

U.S. PATENT DOCUMENTS

| | | | |
|---|---|---|---|
| 3,994,795 | A | 11/1976 | Kurr |
| 4,190,512 | A | 2/1980 | Wyatt et al. |
| 5,183,966 | A | 2/1993 | Hurtado et al. |
| 2003/0015436 | A1 | 1/2003 | Bass et al. |
| 2015/0027581 | A1* | 1/2015 | Bouey .................... F16L 9/147 138/141 |

FOREIGN PATENT DOCUMENTS

| | | |
|---|---|---|
| EP | 0 170 129 A1 | 2/1986 |
| EP | 0 219 472 A2 | 4/1987 |
| EP | 0 518 264 A2 | 12/1992 |
| GB | 2 023 021 A | 12/1979 |
| GB | 2 406 367 | 3/2005 |
| JP | 58-096882 A | 6/1983 |
| WO | WO 2008/033028 A1 | 3/2008 |

OTHER PUBLICATIONS

International Preliminary Report on Patentability (Chapter 1 of the Patent Cooperation Treaty) and Written Opinion of the International Searching Authority dated Dec. 23, 2014 in corresponding International Application No. PCT/EP2013/059688.

Extended European Search Report and Search Opinion dated Nov. 30, 2012 in corresponding European Patent Application No. EP12 17 2555.

* cited by examiner

PIPELINE AND METHODS

CROSS REFERENCE TO RELATED APPLICATIONS

The present application is a 35 U.S.C. §371 National Phase conversion of PCT/EP2013/059688, filed May 9, 2013, claiming the benefit of European Application no. 12172555.0, filed Jun. 19, 2012, the disclosure of which is incorporated herein by reference. The PCT International Application was published in the English language.

TECHNICAL FIELD OF THE INVENTION

The present invention relates to a pipeline requiring cathodic protection, and to methods of forming and laying such a pipeline.

BACKGROUND OF THE INVENTION

Pipelines can be formed from different steel types, including stainless steels as duplex, and martensitic chromium steels. However, all steels will corrode when exposed to water, especially sea water.

The coating of steel pipes is well known to prevent corrosion, but the coating is prone to damage, exposing the pipe directly to the water. Thus, a conventional method of assisting the corrosion-protection of steel pipes has been the addition of anodes, in particular sacrificial anodes, made from a metal which degrade preferentially to the pipe material.

The traditional technique for the connection of anodes to a pipeline has been to use pads welded directly to the pipeline by means of fillet welds. However, fillet welds create a stress concentration at the weld toe, leading to the possibility of hydrogen induced stress cracking (RISC), and thus failure of the pipeline.

GB2406367B describes an 'anode bank' pipe including a soft steel sleeve made from St255 or St355, and having at least 100 cm between the edge of the sleeve and an electrical conductor. The sleeve is provided in the form of two semi-circular profiles being preferably 6 m long placed over the load-bearing tube and secured together by a longitudinal weld. This sleeve is also welded to the tube at its ends. Further similar sleeve portions are preferably provided around the tube to provide additional strength to the connection between the sleeve and the tube to take account of the stress applied to the tube during use.

Thus, the application of each main sleeve discussed in GB2406367B requires welding operations, which still leads to the possibility of hydrogen induced stress cracking. Also, there is no assurance of the fixation of sleeve on the tube—hence the additional sleeve portions.

Also, although GB2406367B states that its pipe may be reeled onto a drum which allows for launching of a pipeline in use, the sleeve is described as being 2-10 m long, preferably 6 m long. Such a long sleeve is not easily bendable in its own right, and the problems of hydrogen induced stress cracking and the lack of integration between the sleeve(s) and the load-bearing tube would only be increased if such a pipe would ever be subjected to the bending required for the pipe to be reeled onto a drum. The length and nature of the sleeve do not suggest that this is possible in practice without affecting the integrity of the pipe and/or sleeve.

SUMMARY OF THE INVENTION

It is an aim of the present invention to provide cathodic protection to a pipeline without the need for welding on the pipeline. The technique could be applied for laying the pipeline using any pipe-laying method.

Thus, according to one aspect of the present invention, there is provided a pipeline comprising one or more pipes, the pipeline having:

one or more sacrificial anodes thereon to provide cathodic protection;

one or more pre-formed metallic rings around at least one pipe; and one or more electrical connections attached to the or each metallic ring and to at least one sacrificial anode to allow an electrical current to flow between the pipeline and one or more of the sacrificial anodes.

Because the or each metallic ring is pre-formed, it can be fitted to the pipe without the need for any subsequent welding, avoiding the problems associated with welding discussed above. Moreover, a pre-formed ring also has no obvious weaknesses, so that there is greater assurance of its fixing to or with the pipe. Furthermore, a relative thin ring is more compliant with any working on the pipe, in particular bending, compared with usually longer sleeves or other types of long sections.

The or each ring may be pre-formed in any known manner including casting, cutting, punching, machining etc, to form a monolithic or seamless single or one-piece, ring and which is generally homogeneous or uniform.

The pipeline may be formed of one or more pipes, also sometimes termed pipe sections, in a manner known in the art. The pipeline may extend a short distance or several kilometers, and may include two or more pipes having one or more metallic rings therearound, such as a regularly introduced pipe section, particularly to provide cathodic protection to an extensive length of the pipeline. The number and frequency of pipes able to provide cathodic protection to a pipeline are known to those skilled in the art.

According to one embodiment of the present invention, the or each metallic ring has an inner diameter equal to or less than the outer diameter of the pipe.

The dimensions of the or each metallic ring are dependent upon the dimensions of the pipes. Other dimensions are not limiting. For example, the height of a metallic ring could be several millimeters or more, typically in the range 5-50 mm. The width of the metallic ring could also be several millimeters or more, typically in the range 5-50 mm.

The pipe, or the overall pipeline, could comprise two or more metallic rings being the same or different, in terms of physical parameters, dimensions, materials, methods of fitting, or a combination of same.

Suitable methods of locating or attaching or fitting the metallic ring to the pipe without welding, and to allow it to fit and close around the pipe with assurance, are well known in the art. These include interference, friction, and compressive fitting.

Preferably, the metallic ring is expanded to allow it to fit around the pipe, and then contracted. Examples include heat shrinking and tensioning a pre-tensioned split ring.

Thus, in one embodiment of the present invention, the pipeline comprises one or more metallic rings wherein the or each metallic ring is a heat-shrink ring.

In another embodiment of the present invention, the pipeline comprises one or more metallic rings wherein the or each metallic ring is a pre-tensioned split ring.

The present invention may comprise a mixture of combination of such metallic rings.

The metallic ring(s) may be formed from any suitable material able to be fitted around a pipe. Optionally, the or each metallic ring is formed from carbon steel.

Suitable heating and cooling regimes for expanding and contracting a metallic ring to allow it to close and fit around the pipeline, are known in the art.

Electrical connectors for attaching to the metallic ring to sacrificial anodes allowing an electrical current to flow between the anodes and the pipeline are known in the art, and include any form of attachment which can be sufficiently connected to the metallic ring. Such attachment can be by welding, and such attachments can be formed from suitable steel rods or wires which can be easily formed or shaped as required.

Optionally, there are provided a plurality of electrical connectors attached to the or each metallic ring. This provides greater flexibility to the installer or layer of the pipeline.

The pipeline may be an underwater pipeline, in particular in a sea. Such a pipeline may be for the passage of a fluid, such as but not limited to one or more hydrocarbons such as oil and gas.

The pipeline may be a reelable pipeline. That is, able to be located on a reel for subsequent laying, generally by a pipe-laying vessel.

The pipeline may include a coating. The coating is preferably applied or added beyond the electrical connector(s), and is generally the same as or similar to coatings known in the art for protecting pipe and pipelines, in particular those being located underwater. This can include a degree of thermal insulation as well as outer physical protection, and suitable materials, thicknesses and processes for applying such a coating are known in the art and are not further described herein.

According to another aspect of the present invention, there is provided a method of forming a pipeline comprising one or more pipes and requiring cathodic protection, comprising at least the steps of:
  providing a pipe;
  expanding one or more metallic rings;
  locating the or each metallic ring over the pipe;
  allowing the or each expanded metallic ring to contract;
  forming the pipeline comprising at least the pipe with the metallic ring;
  attaching one or more electrical connectors to the or each metallic ring to allow an electrical current to flow between the pipeline and one or more sacrificial anodes.

The or each metallic ring could be expanded by heating, for example induction heating.

Alternatively, the or each metallic ring could be is a pre-tensioned split ring and the or each split ring is expanded by outward tensioning.

Optionally, the method of the present invention comprises expanding the or each metallic ring by heating to locate the metallic ring over the inner pipeline.

Optionally, the method of the present invention comprises pushing the or each metallic ring over the inner pipeline.

Preferably, the or each metallic ring has an interference or compressive fit with the pipe.

Optionally, the or each metallic ring is heat-shrunk onto the inner pipeline.

According to a further aspect of the present invention, there is provided a method of cathodically protecting a pipeline; comprising at least the steps of:
  providing a pipeline as defined herein;
  adding one or more sacrificial anodes to at least one of the electrical conductors; and
  laying said pipeline.

Optionally, the method is for cathodically protecting an underwater pipeline.

Optionally, the pipeline is provided on a reel, and the pipeline is laid from the reel.

In another embodiment of the present invention, there is provided a method of forming and laying an underwater pipeline requiring cathodically protection comprising at least the steps of;
(i) providing a pipe;
(ii) expanding one or more metallic rings;
(iii) locating the or each metallic ring over the pipe;
(iv) allowing the or each expanded metallic ring to contract;
(v) forming the pipeline using the pipe with the metallic ring;
(vi) attaching one or more electrical connectors to the or each metallic ring to allow an electrical current to flow between the pipeline and one or more sacrificial anodes;
(vii) coating the pipeline;
(viii) reeling the pipeline onto a reel transportable by a pipeline-laying vessel;
(ix) relocating the pipeline to an offshore installation site on the pipeline-laying vessel;
(x) unreeling the pipeline for laying under the water;
(xi) adding one or more sacrificial anodes to the pipeline;
(xii) connecting the sacrificial anodes to the electrical connector(s); and
(xiii) laying the pipeline under the water.

BRIEF DESCRIPTION OF THE DRAWINGS

Embodiments of the present invention will now by described by way of example only and with reference to the accompanying drawings in which:

FIG. 2 is a schematic side view of a method of forming a pipe according to another embodiment of the present invention; and.

DESCRIPTION OF PREFERRED EMBODIMENTS

Figure 1:
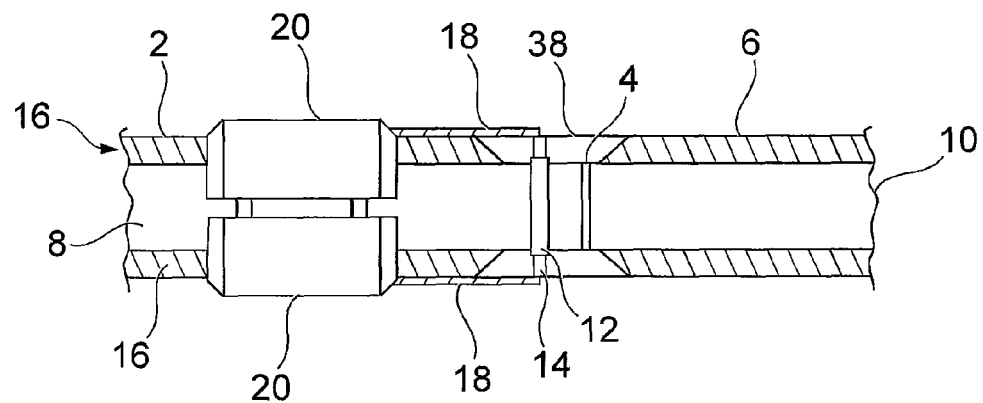
FIG. 1 is a side view of a pipe according to one embodiment of the present invention.

Referring to the drawings, FIG. 1 shows a pipe 2 welded via a weld 4 to a separate pipe or pipeline section 6. Whilst not shown herewith, the skilled man can appreciate that the pipeline section 6 may be one of a number of further pipeline sections together forming a pipeline, optionally several hundred meters long, and possibly several kilometers long. Such pipelines are known in the art, and can be suitable for the passage of a fluid, in particular a hydrocarbon fluid such as oil and/or gas. Such pipelines include underwater hydrocarbon pipelines.

An underwater pipeline is susceptible to corrosion, especially because of the wet chloride environment, and more especially where the pipeline is at a relatively ambient temperature. Where the pipe and any pipeline sections are formed from stainless steel, anodic protection is commonly used to assist corrosion protection. The operation and action of anodic protection to pipes in pipelines is well known in the art.

FIG. 1 shows the pipe 2 comprising an inner flowline 8 for the passage of a fluid, the inner flowline 8 being sensitive to hydrogen. The inner flowline 8 could be formed of a stainless steel.

The inner flowline 8 preferably has an inner diameter being wholly or substantially the same as the inner diameter of any connected pipes or pipe sections, such as the inner flowline 10 of the pipe section 6, so as to form a continuous and smooth bore therebetween. Similarly, the outer diameter of the inner flowline 8 may be the same or similar to that of the outer diameter of connected pipes or pipe sections. One example is a '10 inch' (254.4 mm) outer diameter pipe known in the art.

FIG. 1 shows the pipe 2 having a metallic ring being a carbon-steel ring 12 fitted around the inner flowline 8. Attached to the carbon-steel ring 12 are two electrical connectors 14 able to allow an electrical current to flow to the pipe 2.

The pipe 2 includes a coating 16 around the inner flowline 8.

FIG. 1 also shows each electrical connector 14 connected to an anode flat bar 18, and then to two anodes 20, secured to the pipe 2 in a manner known in the art.

The carbon-steel ring 12 is pre-formed, and could be formed in a number of known methods. For example, it could be machined from a single piece of flat steel, such as steel plate, having the required thickness or depth such as 10 mm, 12 mm or 15 mm. Such rings can be easily cut from a suitable steel plate to provide integral and single pieces or units for use with the present invention.

Preferably, the carbon-steel ring 12 has an inner diameter equal to or less than the outer diameter of the pipe 2. For example, the carbon-steel ring 12 could have an inner diameter of 1 mm, 2 mm, 3 mm or 4 mm less than the outer diameter of the pipe 2. Again, the dimensions required for cutting suitable carbon-steel rings from a steel plate are easy to calculate, providing ease of manufacture.

Figure 2:
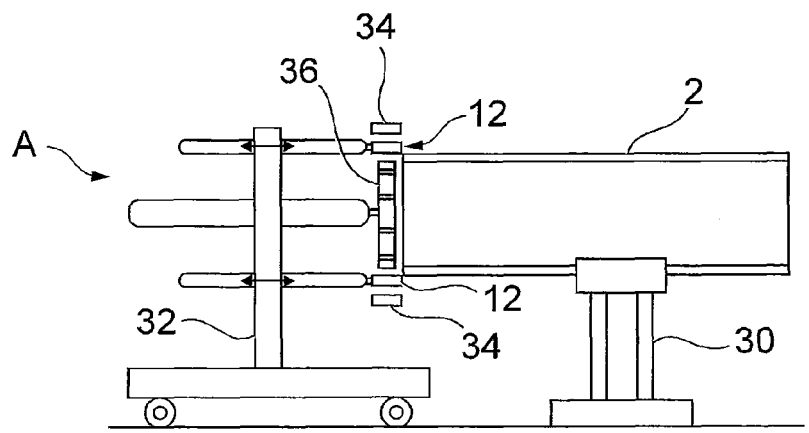
Figure 2A:
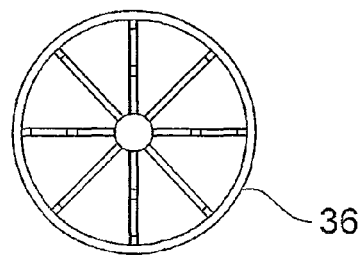
FIG. 2a is an expanded front view of part of FIG. 2.

FIG. 2 shows the pipe 2 supported on a stand 30. The carbon-steel ring 12 is supported on a moveable trolley 32 by one or more arms. In alignment with the carbon-steel ring 12 is an induction coil 34 and work ring 36. A front view of the work ring 36 is shown in more detail in FIG. 2a.

In a method of adding the carbon-steel ring 12 around the pipe 2, the carbon-steel ring 12 is heated by induction through the surrounding induction coil 34. Preferably, the carbon-steel ring 12 is heated to a temperature in the range 1000° C. to 1100° C. so as to cause its expansion, and in particular its expansion such that its inner diameter is now the same as, or preferably greater than, the outer diameter of the pipe 2. Once the heated carbon-steel ring 12 has achieved this dimension, it is moved by the trolley 32 to fit around the pipe 2 in direction A as shown in FIG. 2.

Once the carbon-steel ring 12 is located around the pipe 2, the carbon-steel ring 12 is allowed to cool so as to fit, more particularly shrink fit, around the pipe. One or more electrical connectors (not shown in FIG. 2) can then be attached to the carbon-steel ring 12 by welding or other fixing methods.

The cooling of the heated carbon-steel ring 12 may be air-cooled, or assisted by the application of one or more cooling fluids such as water, in particular cold water, to accelerate the shrinkage of the expanded carbon-steel ring 12. This also assists tempering the carbon-steel ring 12, and the securement of its fitting with the pipe 2. Rapid cooling, such as over a number of seconds, can achieve a bainitic/martensitic microstructure in the carbon-steel ring 12, and preferably provide the carbon-steel ring 12 with the yield strength above 500 MPa.

A coating, such as coating 16 shown in FIG. 1, is applied around the inner flowline 8. Optionally, a different coating, such as a thermal coating 38, can be applied at or near or around the area of the inner flowline 8 having the carbon-steel ring 12, as shown in FIG. 1, such coating avoiding or being around the electrical connectors 14.

In particular, the relative thinness of the carbon-steel ring 2, and its fitment onto the inner flowline 8, allows the carbon-steel ring 2 to bend with the remainder of the pipe 2. Hence, any pipeline formed with at least one section being a pipe as described herein, could be reeled and straightened according to the requirements of the reel laying methods used to install subsea pipelines.

Thus, the present invention provides a pipeline for the passage of a fluid, and one or more metallic rings fitted around at least one of the pipes forming the pipeline for easy and convenient attachment of one or more electrical connectors to allow an electrical current to between the pipeline and sacrificial anodes. Because the metallic ring(s) have an integral form and can be relatively thin, they provide greater assurance of their fixing to or with the pipeline, and they are more compliant with any working on the pipe, in particular bending, making the pipe more suitable for reel-laying for example with an associated pipeline whilst still providing the required cathodic protection.

Various modifications and variations to the described embodiments of the invention will be apparent to those skilled in the art without departing from the scope of the invention as defined herein. Although the invention has been described in connection with specific preferred embodiments it should be understood that the invention as defined herein should not be unduly limited to such specific embodiments.

The invention claimed is:

1. A pipeline comprising one or more pipes, the pipeline having:
   one or more sacrificial anodes thereon to provide cathodic protection;
   one or more weld-free metallic rings around at least one of said one or more pipes; and
   one or more electrical connectors attached to each metallic ring and at least one of said one or more sacrificial anodes to allow an electrical current to flow between the pipeline and one or more of the one or more sacrificial anodes.

2. The pipeline as claimed in claim 1, wherein each ring has an initial inner diameter equal to or less than an outer diameter of the one or more pipes.

3. The pipeline as claimed in claim 1, wherein each metallic ring is a heat-shrink ring.

4. The pipeline as claimed in claim 1, wherein each metallic ring is a pre-tensioned split ring.

5. The pipeline as claimed in claim 1, wherein each metallic ring is formed from carbon steel.

6. The pipeline as claimed in claim 1, wherein the pipeline is an underwater pipeline.

7. The pipeline as claimed in claim 1, wherein the pipeline is a reelable pipeline.

8. A method of forming a pipeline comprising at least one pipe and requiring cathodic protection, comprising the steps of:
   providing at least one pipe;
   expanding one or more weld-free metallic rings;
   locating each metallic ring over the at least one pipe;
   allowing each expanded metallic ring to contract;
   forming the pipeline comprising at least the at least one pipe having the one or more metallic rings thereon;
   attaching one or more electrical connectors to each metallic ring to allow an electrical current to flow between the pipeline and one or more sacrificial anodes.

9. The method as claimed in claim 8, wherein each metallic ring is expanded by heating.

10. A method of forming a pipeline comprising at least one pipe and requiring cathodic protection, comprising the steps of:
   providing at least one pipe;
   expanding one or more weld-free metallic rings;
   locating each metallic ring over the pipe;
   allowing each expanded metallic ring to contract;
   forming the pipeline comprising at least the pipe with the metallic ring; and
   attaching one or more electrical connectors to each metallic ring to allow an electrical current to flow between the pipeline and one or more sacrificial anodes;
   wherein each metallic ring is expanded by heating; and
   wherein the heating is induction heating.

11. The method as claimed in claim 8, wherein each metallic ring is a pre-tensioned split ring and each split ring is expanded by outward tensioning.

12. The method as claimed in claim 8, wherein each metallic ring has an initial inner diameter equal to or less than an outer diameter of the at least one pipe prior to expansion.

13. The method as claimed in claim 8, comprising pushing each metallic ring over the at least one pipe.

14. The method as claimed in claim 8, wherein each metallic ring has an interference or compressive fit with the at least one pipe.

15. A method of cathodically protecting a pipeline, comprising the steps of:
   providing a pipeline as defined in claim 1;
   adding one or more sacrificial anodes to at least one of the electrical connectors; and
   laying said pipeline.

16. The method as claimed in claim 15 for cathodically protecting an underwater pipeline.

17. The method as claimed in claim 15, wherein the pipeline is provided on a reel, and wherein the pipeline is laid from the reel.

18. A method of forming and laying an underwater pipeline comprising one or more pipes and requiring cathodically protection comprising the steps of:
   (i) providing a pipe;
   (ii) expanding one or more weld-free metallic rings;
   (iii) locating each metallic ring over the pipe;
   (iv) allowing each expanded metallic ring to contract;
   (v) forming the pipeline using the pipe with each metallic ring;
   (vi) attaching one or more electrical connectors to each metallic ring to allow an electrical current to flow between the pipeline and one or more sacrificial anodes;
   (vii) coating the pipeline;
   (viii) reeling the pipeline onto a reel transportable by a pipeline-laying vessel;
   (ix) relocating the pipeline to an offshore installation site on the pipeline-laying vessel;
   (x) unreeling the pipeline for laying under the water;
   (xi) adding said one or more sacrificial anodes to the pipeline;
   (xii) connecting each of the sacrificial anodes to a respective electrical connector of said one or more electrical connectors; and
   (xiii) laying the pipeline under the water.

* * * * *